(12) United States Patent
Xiong et al.

(10) Patent No.: US 9,202,023 B2
(45) Date of Patent: Dec. 1, 2015

(54) DIGITAL RIGHTS MANAGEMENT METHOD

(71) Applicant: Fujian Foxit Software Development Joint Stock Co., Ltd., Fuzhou (CN)

(72) Inventors: Yuqian Xiong, Fuzhou (CN); Guojia Wang, Fuzhou (CN)

(73) Assignee: FUJIAN FOXIT SOFTWARE DEVELOPMENT JOINT STOCK CO., LTD., Fuzhou (CN)

( * ) Notice: Subject to any disclaimer, the term of this patent is extended or adjusted under 35 U.S.C. 154(b) by 0 days.

(21) Appl. No.: 14/421,297

(22) PCT Filed: Jun. 14, 2013

(86) PCT No.: PCT/CN2013/000698
§ 371 (c)(1),
(2) Date: Feb. 12, 2015

(87) PCT Pub. No.: WO2014/026462
PCT Pub. Date: Feb. 20, 2014

(65) Prior Publication Data
US 2015/0205941 A1 Jul. 23, 2015

(30) Foreign Application Priority Data

Aug. 16, 2012 (CN) .......................... 2012 1 0292637

(51) Int. Cl.
| G06F 17/30 | (2006.01) |
| H04N 7/16 | (2011.01) |
| G06F 21/10 | (2013.01) |
| G06F 21/00 | (2013.01) |

(Continued)

(52) U.S. Cl.
CPC ................ G06F 21/10 (2013.01); G06F 21/00 (2013.01); G06F 21/604 (2013.01); G06F 21/6209 (2013.01); G06F 21/64 (2013.01); H04L 9/32 (2013.01); H04L 2209/60 (2013.01)

(58) Field of Classification Search
CPC ..... G06F 21/10; G06F 21/6209; G06F 21/64; G06F 21/604; H04L 9/32; H04L 2209/60

USPC .......... 713/168–174, 182–186, 202; 709/206, 709/225, 229, 249, 389; 726/2–8
See application file for complete search history.

(56) References Cited

U.S. PATENT DOCUMENTS

| 2002/0091925 A1* | 7/2002 | Suzuki | .................... G06F 21/10 713/168 |
| 2014/0130117 A1* | 5/2014 | Jeannot | ................... H04L 63/08 726/1 |

FOREIGN PATENT DOCUMENTS

| CN | 1996834 | 7/2007 |
| CN | 101458745 | 6/2009 |

(Continued)

OTHER PUBLICATIONS

International Search Report filed in PCT/CN2013/000698 mailed Sep. 19, 2013.

*Primary Examiner* — Evans Desrosiers
(74) *Attorney, Agent, or Firm* — Rankin, Hill & Clark LLP

(57) ABSTRACT

The present invention discloses a kind of management method for digital rights, wherein, it comprises the following steps: Step S1: the original electronic file is encrypted on the server-side, and in the meantime, the flow code, the file unique identifier, the authorization locations and verification information is injected; Step S2: obtaining flow codes, file identifier, authorization locations and verification information from the encrypted file, and then conducting integrity verification thereon; step S3: After it is verified that there is no error, the related information is sent to the authorization server; S4: after receiving the injection information about the encrypted file, the authorization server conducting integrality verification firstly, then judging the type of encryption file according to the flow code, and generating an authorization file and sending the same according to the type; Step S5: a decryption tool obtaining the authorization file to conducting integrality verification on the authorization information, and then decrypting, parsing, using same under the right control. By means of the above method of the present invention, a user can self-define the file encryption intensity under the condition of no changing or very little changing of an encryption/decryption tool.

6 Claims, 2 Drawing Sheets

(51) Int. Cl.
*H04L 9/32* (2006.01)
*G06F 21/62* (2013.01)
*G06F 21/60* (2013.01)
*G06F 21/64* (2013.01)
*G06F 1/00* (2006.01)
*H04N 7/167* (2011.01)

(56) References Cited

FOREIGN PATENT DOCUMENTS

| CN | 101833623 | 9/2010 |
| CN | 101938468 | 1/2011 |

* cited by examiner

DIGITAL RIGHTS MANAGEMENT METHOD

TECHNICAL FIELD

The present invention relates to a kind of management method, particularly relates to a management method for digital rights.

BACKGROUND

DRM, stands for Digital Rights Management in full English name. The characteristics of digital information determines that there must be another unique technology to be applied to strengthen protection of the copyright of the digital audio and video content, said technology is digital rights management technology—DRM (digital rights management).

As shown in FIG. 1, which is a relatively common method for digital rights management, that is one pair of encryption/decryption tool, and can only implement the encryption of one authorization type file, it need different types of file encryption/decryption tools to implement the encryption of different type of the file for different user and apply the different verification process. This method takes great inconvenience to both the DRM users and end-users, because the different encryption/decryption tools need to be installed and used so as to look over different types of encrypted files.

Therefore, how to design an effective method for digital rights management is the study direction of those skilled in the art.

SUMMARY OF THE INVENTION

The main purpose of the present invention is to provide a method for digital rights management, which is that the users can self-define the intensity of the file encryption in the case of no change or change a little bit of the encryption/decryption tool.

In order to achieve the above object, the present invention provides a method for digital rights management, it comprises the following steps:

Step S1: The original electronic file is encrypted on the server-side, and in the meantime, the flow codes, the file unique identifier, the authorization locations and verification information are injected.

Step S2: obtaining flow codes, file identifier, authorization locations and verification information from the encrypted file, and then conducting the verification of the integrality.

Step S3: After being proven to be accurate, the relevant information is sent to the authorization server;

Step S4: when the authorization server receives the injected information of the encrypted file, it verifies the integrality first, and then estimates the type of the encrypted file according to the flow code, conducts the verification process depending on the type requirement, after the verification flow is complete, and combines the available information plus an encrypted file key into an authorization document, sends and feedbacks the authorization document to the decryption terminal;

Step S5: when the decryption tool obtains the authorization file, it makes the verification of the integrality of the authorization information, and then it decrypts, parses, and uses same under the right control.

Wherein, said flow code is represented in a 32-bit code integer, which is that the different positions represent the different types of files, and the different verification process is applied.

Wherein, in step S1, a kind of general encryption tool is applied to turn the original digital resources into the cipher text digital resource by a symmetric cryptography algorithm.

Wherein, said symmetric cryptography algorithms are RC4, AES.

Wherein, in step S2, the user gains the encrypted file, and decrypts it by a kind of the decoding tool.

Wherein, said relevant information in step S3 is the public key, injecting information and signature information.

Wherein, said authorization file in step S4 includes the following information: envelope identifications, file identification, limits of authority, secret key encrypted by the client public key, signature of the authorization server and verifying information.

Compared with the existing technology, the present invention includes the following beneficial effects:

The present invention encrypts files by the ways of adding flow codes in the encryption dictionary, that is, the different flow code value represents the different verification items in the decryption process. It is that the digital content owner can send the different verification types of encrypted file to the different end users by encryption tools in the case of changing no encryption/decryption tool. The present invention is very convenient because it need not to install and use different encryption and decryption tool.

BRIEF DESCRIPTION OF THE FIGURES

In order to illustrate the technical proposal of implementations of the embodiments of the present invention or existing technology clearly, With reference to said accompanying drawings, the description of the implementations of the present invention or existing technology are given as following briefly. Obviously, the given accompanying drawings are only implementations of the present invention, so that, the ordinary technicians in this field could get other accompanying drawings in accordance with said accompanying drawings without devoting a creative work.

DETAILED DESCRIPTION OF THE EMBODIMENTS

With reference to said accompanying drawings in the embodiments of the present invent, the description of the technical proposal of implementations of the present invention is given clearly and integrality as following. The given implementations are only part of the implementations to the present invention obviously, but not entire implementations. Based on the implementations of the present invention, all of the other implementations which get without devoting a creative work by the ordinary technicians in this field should be deemed to be within the scope of the present invention.

Figure 1:
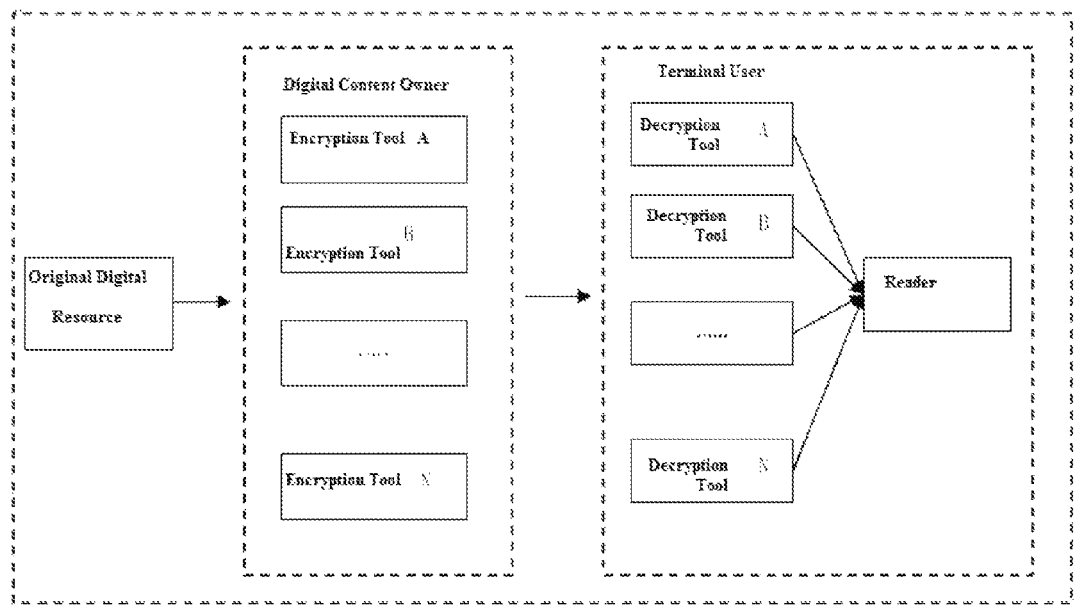
FIG. 1 is a block diagram of the existing technology.
Figure 2:
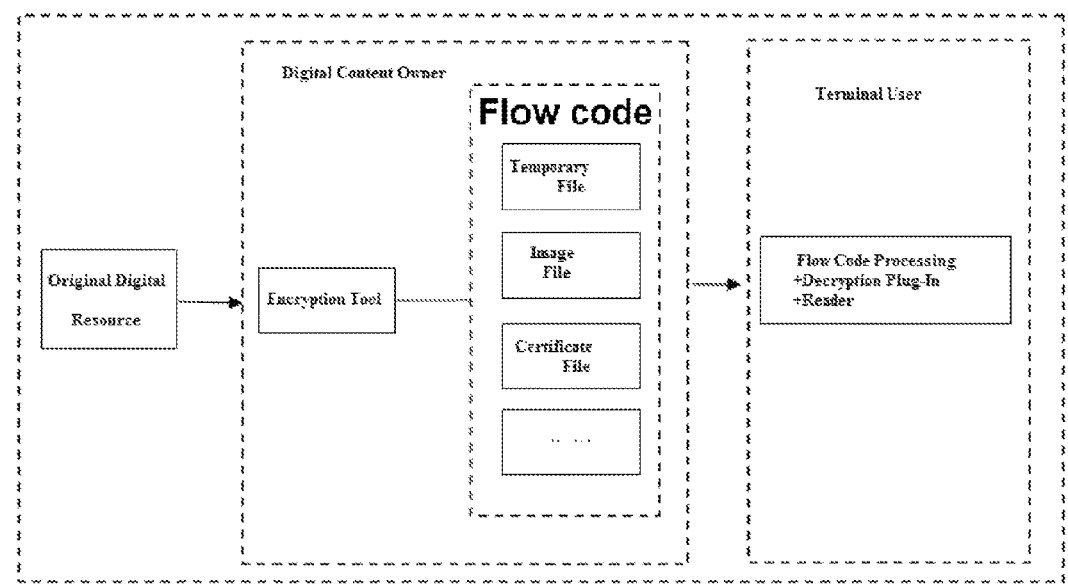
FIG. 2 is a block diagram of a kind of the management method for digital rights to the present invention.
Figure 3:
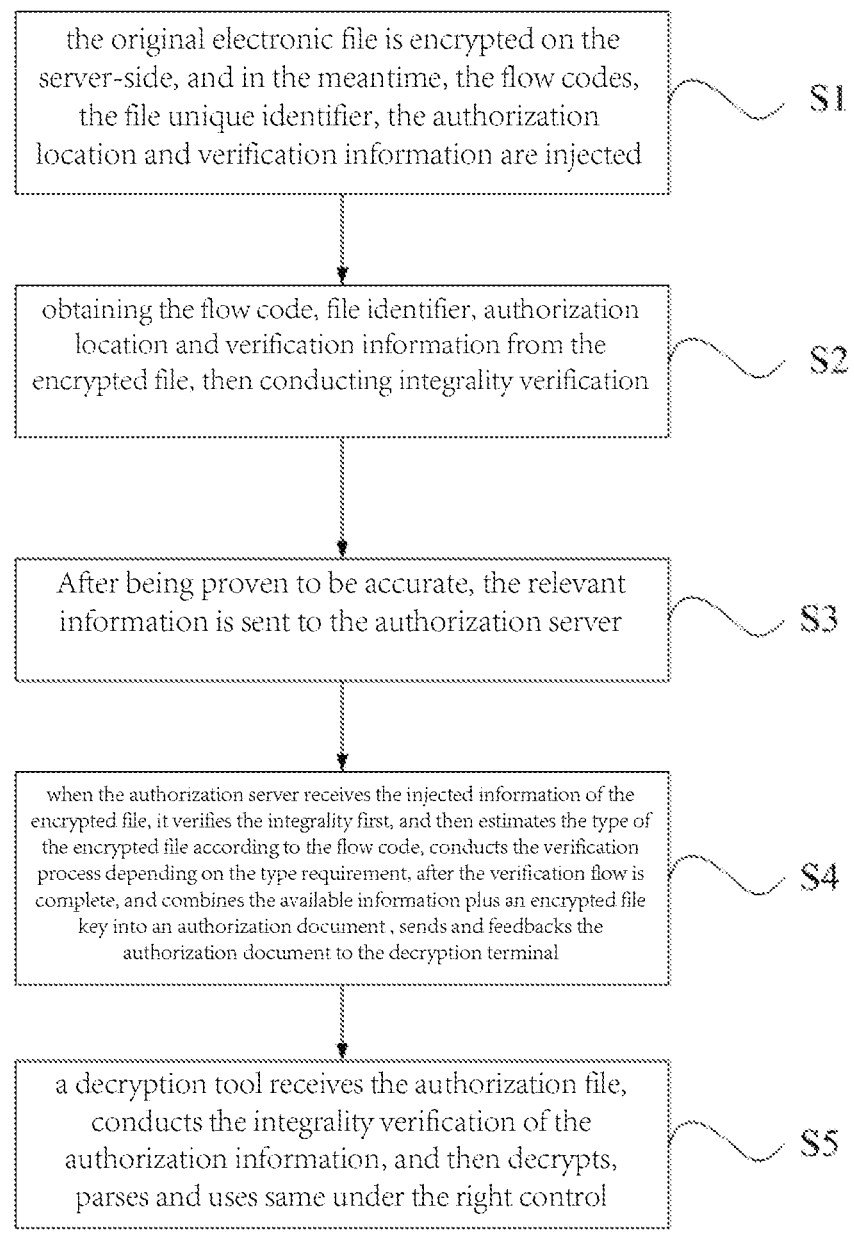
FIG. 3 is a flow diagram of the management method for digital rights to the present invention.

As shown in FIGS. 2 and 3, which is the block diagram and flow diagram of a kind of management method for digital rights to the present invention; said management method for digital rights to the present invention comprises the following steps:

Step S1: the original electronic file is encrypted on the server-side, and in the meantime, the flow codes, the file unique identifier, the authorization locations and verification information are injected.

Wherein, said flow code is represented in a 32-bit code integer, which is that the different positions represent the different types of files, and the different decrypting flow is applied for decoding, such as: 1 represents the temporary authorization documents, 3 represents the image file and so on.

The unique identifier of the file is indicated with the file ID generally; the authorized position is indicated with the URL address; injecting verification information is indicated with MD5 commonly.

In step S1, a kind of general encryption tool is applied to turn the original digital resources into the cipher text digital resources, and the symmetric cryptography algorithms are used for flowing, such as RC4, AES etc, the flow codes, the file unique identifier, the authorized locations and verification information are injected into the encryption file while the original resource is encrypted, and sent to the end user with the encryption file, besides the flow codes, there also are the file unique identifies [that is the file ID], the authorized locations [that is the authorization server URL].

Step S2: getting the flow code, file identification, authorization location and verification information from the encrypted file, then conducting the verification of the integrality.

Step S3: After being proven to be accurate, the relevant information is sent to the authorized server.

In step S2, and S3, the user gains the encrypted files, and decrypts them by one kind of the decoding tool. The decryption tool verifies the integrity of the injected information, and then sends the public key, injecting information and signature information to the authorization server under its own client circumstance.

Step S4: the authorization server receives the information injected by the encrypted file, and verifies the integrity first, and then determines the encrypted file types according to the flow code, does the verification flow depending on the demand of the type, after the verification is completed, a license file is combined according to the available information, and plus encrypted files Key, the authorized file will be sent and feed backed to the decrypt side;

In the step S4, the authorization server verifies the integrality of the signing messages and the injected information first, then gets the type of the encrypted file by the encrypted flow code, and generates the relevance authorization file according to different type of the encrypted file and the public key of the client circumstance, said authorization file includes but not be restricted to the following information: the envelope identification, the file identification, the limits of authority, the secret key encrypted by the client public key, the signature of the authorization server and the verifying information and etc. .

Step S5: when the decryption tool obtains the authorization file, it makes the verification of the integrity of the authorization information, and then decrypts, parses, and uses it under the right control.

In step S5, the encrypted tools obtain the authorization information, and make the verification of the integrity of the authorization information first, then get the information of the secret key, permission etc. by its own private key, finally it decrypts, parses, and is applied under the right control.

In summary, the present invention tends to apply the method of handling it by adding the flow codes in the encryption dictionary in time of encrypting the files, that is, the value of the different flow code represents the different verification items in the decryption process.

It is that the digital content owner can send the encrypted file of the different verification types to the different end users by using encryption tools without changing the encryption/decryption tool.

It is very convenient without installing and using the different encryption and decryption tools, Finally, it should be noted that: the above embodiments are merely to illustrate the technical aspect of the present invention, but not intended to limit; despite the reference to the aforementioned embodiments of the present invention has been described in detail, those skilled in the art should understand: it is still possible that the technical solution described in the foregoing embodiment is modified, or some technical features are replaced in equivalent; while these modifications or replacements do not essentially corresponding technical solutions departing from the spirit and scope of the invention to implement technical solutions.

What is claimed:

1. A digital rights management method comprising:
    Step S1: encrypting an original electronic file on the server-side, and in the meantime, injecting a flow code, a file unique identifier, an authorization location and a verification information;
    Step S2: obtaining the flow code, the file identifier, the authorization location and the verification information from the encrypted file, then conducting integrality verification;
    Step S3: after being proven to be accurate, sending the relevant information to an authorization server;
    Step S4: when the authorization server receives the injected information of the encrypted file, the authorization server verifies the integrality first, and then estimates the type of the encrypted file according to the flow code, conducts the verification process depending on the type requirement, after the verification flow is complete, and combines the available information plus an encrypted file key into an authorization document, sends and feedbacks the authorization document to a decryption terminal;
    Step S5: a decryption tool receives the authorization file, conducts the integrality verification of the authorization information, and then decrypts, parses and uses same under the right control;
    said authorization file in step S5 includes the following information: envelope identification, file identification, limits to right, secret key for encrypting the client public key, signature of the authorization server and verification information.

2. The digital rights management method according to claim 1, characterized in that said flow code is represented by a 32-bit code integer, which is that the different positions represent different types of authorization files, consequently need different decryption processes.

3. The digital rights management method according to claim 1, characterized in that in step S1, a kind of general encryption tool is applied to turn the original digital resources into cipher text digital resource, the content is encrypted by a symmetric cryptography algorithm.

4. The digital rights management method according to claim 3, characterized in that said symmetric cryptography algorithm is RC4 or AES.

5. The digital rights management method according to claim 1, characterized in that in step S2, the user obtains the encrypted file and decrypts it by a decoding tool.

6. The digital rights management method according to claim 1, characterized in that said relevant information in step S3 is the public key, injecting information and signature information.

\* \* \* \* \*